United States Patent [19]

Weise et al.

[11] Patent Number: 5,617,308
[45] Date of Patent: Apr. 1, 1997

[54] NOISE-IMMUNE, CLAMPED, RESONANT LINK INVERTER

[75] Inventors: Andrew P. Weise, Columbia; Donald P. Cornell, Manchester, both of Conn.

[73] Assignee: Otis Elevator Company, Farmington, Conn.

[21] Appl. No.: 337,343

[22] Filed: Nov. 10, 1994

[51] Int. Cl.⁶ ................................................. H02M 7/5387
[52] U.S. Cl. ....................................... 363/98; 363/132
[58] Field of Search ................................. 363/17, 98, 132; 323/272

[56] References Cited

U.S. PATENT DOCUMENTS 4,701,671  10/1987  Stupp et al. .......................... 315/224
5,412,557   5/1995  Lauw ..................................... 363/37

Primary Examiner—Peter S. Wong
Assistant Examiner—Rajnikant B. Patel

[57] ABSTRACT

A resonant link inverter control for driving a multi-phase induction motor through three feed lines each connected to opposite sides of a DC bus by a pair of switches. A resonant tank circuit connects a source of DC voltage through an inductor to the DC bus and provides a tank capacitor in parallel with the DC bus. A bipolar transistor having an anti-parallel diode, which is in series with a clamp capacitor to form a clamp circuit connected across the tank inductance, is turned off in response to the clamp current bearing a predetermined relationship to voltage across the clamp circuit as well as voltage across the DC source. The current in each feed line is sampled in response to clamp current which is just slightly less than that which causes turnoff of the clamp transistor.

9 Claims, 2 Drawing Sheets

NOISE-IMMUNE, CLAMPED, RESONANT LINK INVERTER

TECHNICAL FIELD

This invention relates to sampling currents being provided to an induction motor by a clamped, resonant link inverter at a point in time when no active power devices are changing state, and the voltages and currents are well controlled and stable.

BACKGROUND ART

It is known that very precise motion control can be achieved utilizing induction motors which are pulsed at high frequency, the state of each pulse (presence or absence) being controlled in response to the actual current of the preceding pulse, typically in each of three phases of the induction motor. A usual scenario is a DC source, such as an AC-to-DC converter, that provides power to each phase of the induction motor in alternating polarities by virtue of switches which take turns conducting (are alternately opened and closed in succeeding cycles), in a threephase, overlapped fashion. By causing the turn-on and turn-off of these switches to occur at points in the cycle where the voltage across the switches is zero, sufficient switching losses are avoided so as to render the system significantly more effective (advancing the efficiency from in the 70's of percent into the 90's of percent). With low losses on the switches, alternative switching devices may be utilized, such as insulated gate bipolar transistors. Zero voltage switching is achieved by using a resonant link between the converter and the inverter. The use of a resonant link eliminates turn-on losses and reduces turn-off losses by an order of magnitude. Achieving a repetitive occurrence of zero voltage to reduce losses requires that the voltage across the resonant tank return to zero after each cycle of oscillation. However, since there are finite losses (the Q is not infinite), successive cycles will consume more and more energy so that the DC bus does not return all the way to zero volts. To overcome this problem, in a system disclosed in Divan U.S. Pat. No. 4,864,483, energy is fed into the resonant tank circuit in every cycle by momentarily shorting the DC bus by turning on all bus switches during the zero voltage period. Shorting of the inverter DC bus feeds energy back into the resonant link circuit but causes the voltage across the bus to have a high peak value, which can approach double the normal DC voltage for the bus. To limit the voltage across the bus, a clamp circuit is provided. The clamp circuit includes a very large capacitor which is initially charged to the difference between the allowed bus voltage and the maximum voltage which may occur as a consequence of the resonant circuit. The clamp also includes an insulated gate bipolar transistor with an antiparallel diode across it. When the DC bus voltage exceeds the sum of the source voltage and the voltage across the clamp capacitor, the diode is forward biased and begins to conduct out of the tank circuit and into the clamp capacitor. Although the voltage across the capacitor will change somewhat due to the addition of charge thereto, with a suitably sized capacitor the voltage remains essentially constant as the conduction of the diode clamps the DC bus at the desired maximum voltage. The diode current, herein referred to as a negative current, decreases to zero and current then must flow in the opposite direction through the bipolar transistor of the clamp circuit. While current is flowing out of the tank circuit to the capacitor, that fact is sensed and the clamp transistor is turned on; because the diode is conducting, the turn-on for the clamp transistor is at zero volts and therefore zero power loss. The transistor is maintained conducting until there is sufficient energy in the tank inductor to ensure returning the DC bus to zero volts at the end of the current cycle, at which time it is turned off. The turn-on and turn-off is controlled by comparing current in the clamp circuit with a scaled function of the voltage across the clamp capacitor (as in FIG. 11 of said Divan patent).

In the prior art, it is known to sample the current feed in each phase of the induction motor as the voltage across that phase goes to zero, thereby to provide an indication of what the pulse state (on or off) should be during the next cycle. However, it has been found that circuits of the type described provide current motor indications which may be as much as several percent in error. In devices such as elevators which require extremely close control over the torque, and therefore the applied current, of the induction motor, current errors of several percent are not acceptable.

It has been found that a resonant link inverter control of the type described hereinbefore has a characteristic of sporadically failing to operate at all as a result of failure to maintain oscillatory voltage across the DC link.

DISCLOSURE OF INVENTION

Objects of the invention include improved accuracy in clamped resonant link induction motor inverter control and reliable operation thereof.

The invention is predicated in part on the discovery that the rate of change of voltage with respect to time of the DC link, as the DC link is brought to zero volts in each cycle, induces currents through the induction motor feed lines as a consequence of stray capacitances along these lines and around the motor itself.

This invention is also predicated in part on the discovery that the sporadic failure to maintain oscillatory voltage across the DC link is due to the fact that an increase in the DC source voltage and/or the voltage across the DC link exceeding its nominal or normal values, can mean that there is not sufficient current in the tank inductor, at the time that the measured value of clamp capacitor vs. clamp voltage turns the clamp transistor off, so that the DC link cannot return completely to zero, whereby oscillations will rapidly damp out and cause operation to cease.

According to the present invention, current being fed to an induction motor by an inverter is measured during a noiseless time which is just prior to driving the DC bus toward zero voltage, in each cycle. According further to the invention, the clamp current in a clamped resonant link induction motor inverter control is utilized to determine the point just before the clamp transistor is to be shut off, thereby signaling the return of the bus voltage toward zero.

Utilization of the present invention causes currents to be measured when there is no erratic noise pulses in the current feed lines to the induction motor, thereby providing an accurate measure of the actual current supply to the motor, in turn permitting more accurate control over motor torque.

According to the invention still further, in the event that the source voltage is increased, the clamp transistor is held on for a longer period of time by requiring that its turnoff is not only dependent upon a comparison of clamp current with clamp voltage, but also in dependence upon a comparison with a function of the DC voltage source connected to the resonant link.

In further accord with the invention, the clamp current is compared with a reduced function of the clamp capacitor voltage and with a reduced function of DC supply voltage to determine when sufficient current has flowed through the tank inductor to permit turning off the clamp transistor.

The present invention therefore accommodates voltage excursions of the DC supply voltage and voltage excursions on the DC link which may, for instance, be occasioned by regenerative operation of the induction motor, such as when a motor is used in an elevator and the load/counterweight imbalance vs. direction of acceleration causes generation of electricity in the drive motor.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
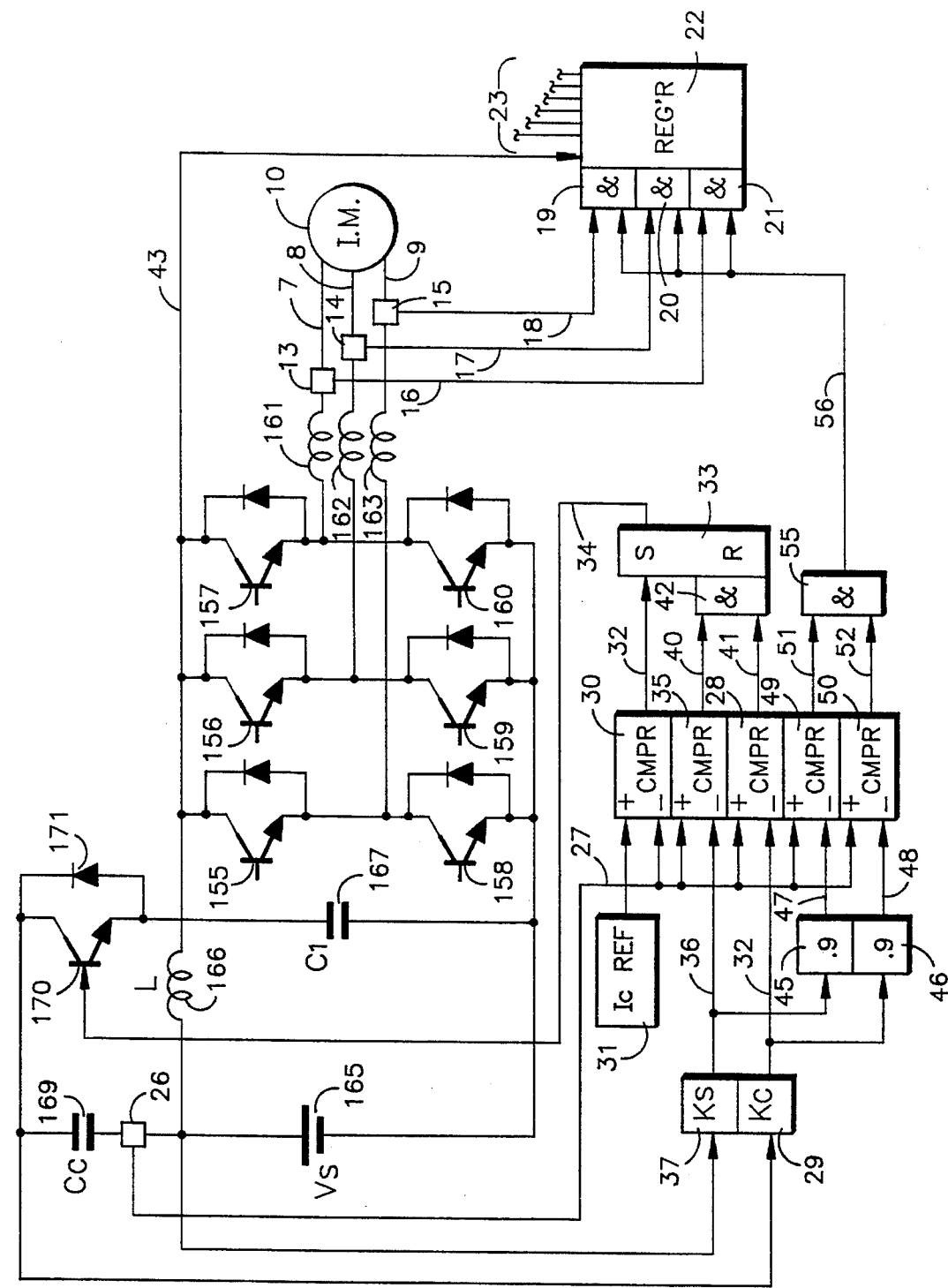
FIG. 1 is a simplified schematic block diagram the present invention of a clamped, resonant link inverter system employing the present invention.

Referring to FIG. 1, an inverter circuit which is substantially shown in FIG. 14 of the aforementioned Divan patent, includes a plurality of inverter switching devices or feed switches 155–160 and effective (stray) output inductances 161–163. The circuit includes a DC voltage supply, Vs, 165 and a resonant tank composed of an inductor, L, 166, and a capacitor, C1, 167. An active clamping circuit connected across the inductor 166 is composed of a clamping capacitor, Cc, 169, and the combination of an electronic switch, such as an insulated gate bipolar transistor 170 and anti-parallel diode 171, and functions in a manner described hereinbefore.

The portion of FIG. 1 described thus far is known to the prior art and set forth in the aforementioned Divan patent. As is also known in the prior art, each current feed line 7–9 over which current is fed to the induction motor 10 has a current sensor 13–15 associated therewith with signals indicative of the current in the lines 7–9 being fed over corresponding lines 16–18 to a plurality of related gates 19–21. The current indications provided through the gates 19–21 are fed to a known regulator 22 to selectively provide turn-on signals on a plurality of lines 23 to the switch devices 155–160 as appropriate.

It is also known in the art to provide a current sensor 26 in the clamp circuit, to provide an indication of current in the clamp over a line 27 to a compare circuit 28 for comparison with an indication of the voltage across the clamp capacitor 169 provided thereto by a scaling amplifier 29. The indication of clamp current on the line 27 is also provided to a comparator 30 for comparison with a clamp current reference 31, that is any chosen amount such that an output from the comparator 30 on a line 32 is assured to occur when the current is in the negative direction, passing through the diode 171. This is an indication that the bipolar clamp transistor 170 can be turned on in a lossless fashion. In this embodiment, the signal on the line 32 may set a bistable device 33 the output of which on a line 34 is provided to the base of the transistor 170, to cause it to conduct. This is the point in time during negative current flow of the clamp current, Ic, illustrated in FIG. 2, and identified as diode current, Dc. The current changes polarity after the clamp capacitor voltage peaks out, and then begins to flow downwardly through the transistor 170, referred to as Qc in FIG. 2. When this current reaches a particular magnitude, indicative of the fact that enough energy has been restored to the inductor 166 to ensure driving the DC bus to zero at the end of the current cycle, the clamp would normally be turned off, in prior devices such as that disclosed in the aforementioned Divan patent, by an output from the compare circuit 28 resetting the bistable device 33, thus removing the base voltage from the transistor 170 and causing the transistor 170 to turn off.

In accordance with the invention, the transistor 170 is not allowed to turn off unless the clamp current also bears a given relationship to a scaled value of the DC source voltage, Vs, so as to ensure adequate current in the inductor 166 to cause the voltage across the tank capacitor 167 to reach zero, even though the voltage of the source or across the link may be elevated. To achieve this, a second compare circuit 35 responds to a scaled value of the DC supply voltage, Vs, on a line 36 from a scaling amplifier 37. The output of the comparator 35 as well as the output from the comparator 28, on respective lines 40, 41 are applied to an AND circuit 42 which resets the bistable device 33, thus removing base voltage and causing the transistor 170 to turn off. At this point (identified as t1 in FIG. 2), the voltage across the DC bus, Vc1, in FIG. 2, begins to drop to zero volts. When the bus reaches zero volts, that fact is sensed by the regulator 22 in response to the voltage on a line 43 (in a known way, by apparatus not shown) and all of the switches 155–160 are momentarily turned on to short the bus to complete the necessary energy transfer so that the bus will continuously return to zero on each resonant cycle. It is during the bus zero voltage time, identified as t2 in FIG. 2, that the current in the lines 7–9 is typically sensed in the prior art. As can be seen by the partial trace referred to as Is NOISE in FIG. 2, these lines are noisy and may have spikes of current bearing no relation to the torque in the motor at this time.

Figure 2:
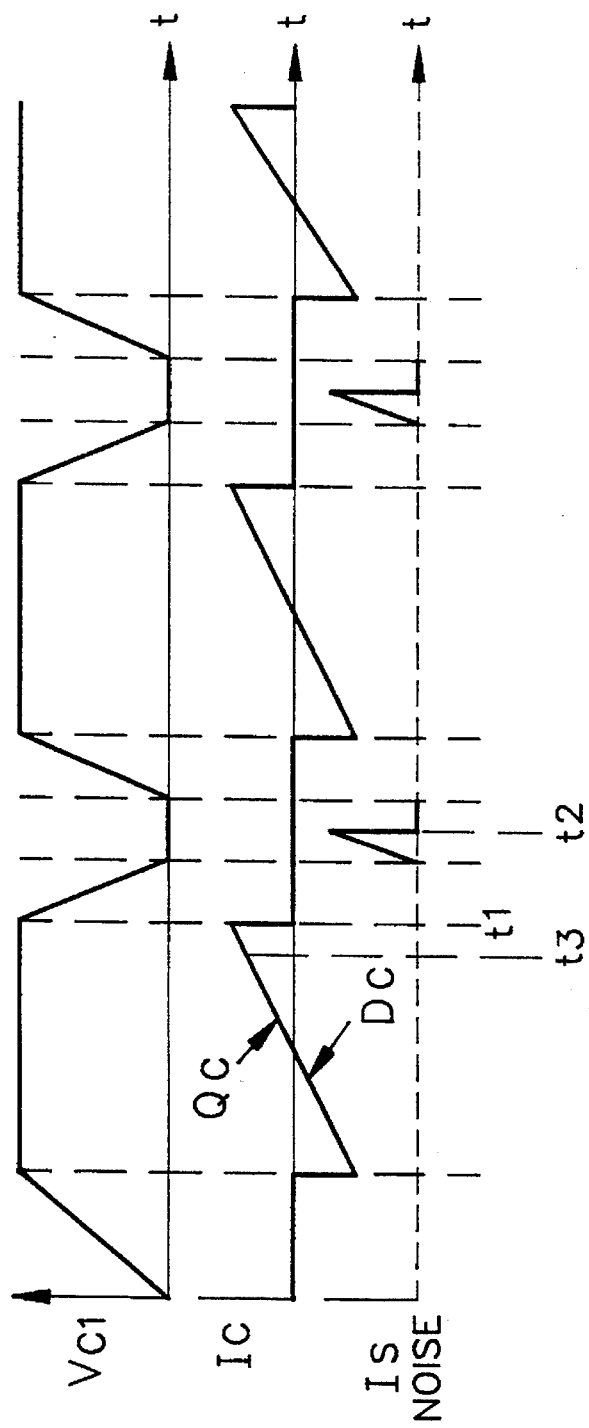
FIG. 2 s a series of waveforms of voltage and current in the circuit of FIG. 1, on a common time base.

According further to the present invention, the signals on the lines 27, 32, 36 are utilized to sense a point in time, t3, in FIG. 2, which is just prior to the point where the clamp 170 is turned off and the bus voltage is allowed to return to zero. This is achieved by using a pair of scaling amplifiers 45, 46 which reduce the value of the voltages on lines 32 and 33 and apply them over corresponding lines 47, 48 to related compare circuits 49, 50. This allows the compare circuits to provide an output when the indication of clamp current on the line 27 is somewhat less (such as 90%, in this embodiment) than it will be when it causes turnoff of the clamp transistor 170. Outputs from both compare circuits 49, 50 on related lines 51, 52 will cause an AND circuit 55 to provide a sampling signal on a line 56 to each of the current sensor gates 19–21. The operative comparison, in nearly all cases, is the compare circuit 50, which compares a function of the clamp current with a function of the voltage in the clamp capacitor (which is normally almost static, as described in the aforementioned Divan patent). The comparator 49 ensures that if the bus voltage Vc1, FIG. 2, is elevated, the transistor will remain on longer to ensure sufficient inductor energy to return that voltage, Vc1, to zero.

The values of Ks (as known) and Kc must be determined for a particular design empirically.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of driving a multiphase induction motor by means of a high frequency resonant link inverter having a DC bus with switches for connecting each phase of said motor to each side of said DC bus, said resonant link causing the voltage across said DC bus to reduce to zero volts twice in each cycle at said high frequency, comprising:

sampling the current in each phase of current supplied to said induction motor in each cycle at said high frequency; and momentarily closing at least two of said switches to totally short circuit said bus each time that said bus reaches zero volts and immediately thereafter selectively operating said switches so as to provide current to said induction motor in accordance with a reference current and in response to the current sampled in said sampling step;

characterized by the improvement comprising:

said sampling step comprising sampling the current in each phase of current supplied to said induction motor at a point in time immediately prior to each time that the voltage across said bus reduces toward zero volts.

2. A method according to claim 1, wherein:

said resonant link includes a frequency determining tank circuit having an inductor in series with said DC bus and a capacitor in parallel with said DC bus, said resonant link having an active clamp circuit connected across said inductor, said clamp including an electronic switch having an anti-parallel diode connected thereacross, said electronic switch and diode in series with a pre-charged clamp capacitor; and said resonant link causing said DC bus to reduce toward zero volts twice in each cycle at said high frequency in response to turning off said electronic switch at a point in time when the current in said inductor is sufficient to drive said bus completely to zero volts; and said sampling step comprises sampling the current in each phase of current supplied to said induction motor at a point in time immediately prior to the time of turning off said electronic switch.

3. A method according to claim 2 wherein said sampling step comprises sampling the current in each phase of current supplied to said induction motor in response to current in said clamp circuit having a predetermined relationship to voltage across said clamp capacitor.

4. A resonant link inverter control for driving a multiphase induction motor, comprising:

a source of DC power;

a DC bus;

a resonant tank circuit, for controlling the oscillation of voltage across said DC bus at a high frequency, connected between said source of DC power and said DC bus, said tank circuit including an inductor in series with one side of said DC bus and a capacitor across said DC bus;

a plurality of current feed lines, one for each phase of said induction motor;

a plurality of pairs of feed switches, each pair connecting one of said current feed lines with both sides of said DC bus;

an active clamp connected across said inductor and including an electronic switch, with an anti-parallel diode thereacross, connected in series with a clamp capacitor;

means for turning on said electronic switch in response to current flow through said diode;

means for turning off said electronic switch in response to a first magnitude of current flow through said clamp capacitor which bears a predetermined relationship to the voltage across said clamp capacitor;

means for sampling the current in each of said feed lines in response to a second magnitude of current in said clamp capacitor which is slightly less than said first magnitude; and a regulator for closing said feed switches selectively to provide current to said motor in accordance with a reference current and in response to said current sampled in each of said feed lines.

5. A method of driving a multiphase induction motor by means of a high frequency resonant link inverter having a DC bus with feed switches for connecting each phase of said motor to each side of said DC bus, said resonant link including a frequency determining tank circuit having an inductor in series with said DC bus and a source of DC power and a capacitor in parallel with said DC bus, said resonant link having an active clamp circuit connected across said inductor, said clamp including an electronic switch having an anti-parallel diode connected thereacross, said electronic switch and diode in series with a pre-charged clamp capacitor, comprising:

turning off said electronic switch at a point in time when the current in said inductor is sufficient to drive said bus completely to zero volts thereby causing said DC bus to reduce toward zero volts twice in each cycle at said high frequency;

sampling the current in each phase of current supplied to said induction motor in each cycle of said high frequency; and momentarily closing at least two of said feed switches to totally short circuit said bus each time that said bus reaches zero volts and immediately thereafter selectively operating said feed switches so as to provide current to said induction motor in accordance with a reference current and in response to the current sampled in said sampling step;

characterized by the improvement in which said step of turning off comprises:

turning off said electronic switch in response to a first magnitude of current flow through said clamp capacitor which bears a first predetermined relationship to the voltage across said clamp capacitor and which also bears a second predetermined relationship to the voltage of said source of DC power.

6. A method according to claim 5, wherein:

said sampling step comprises sampling the current in each phase of current supplied to said induction motor at a point in time immediately prior to the time of turning off said electronic switch.

7. A method according to claim 5 wherein:

said sampling step comprises sampling the current in each phase of current supplied to said induction motor in response to a second magnitude of current in said clamp capacitor which is slightly less than said first magnitude.

8. A resonant link inverter control for driving a multiphase induction motor, comprising:

a source of DC power;

a DC bus;

a resonant tank circuit, for controlling the oscillation of voltage across said DC bus at a high frequency, connected between said source of DC power and said DC bus, said tank circuit including an inductor in series with one side of said DC bus and a capacitor across said DC bus;

a plurality of current feed lines, one for each phase of said induction motor;

a plurality of pairs of feed switches, each pair connecting one of said current feed lines with both sides of said DC bus;

an active clamp connected across said inductor and including an electronic switch, with an anti-parallel diode thereacross, connected in series with a clamp capacitor;

means for turning on said electronic switch in response to current flow through said diode;

means for turning off said electronic switch in response to a first magnitude of current flow through said clamp capacitor which bears a first predetermined relationship to the voltage across said clamp capacitor and which bears a second predetermined relationship to the voltage of said source of DC power;

sampling means for sampling the current in each of said feed lines in each cycle of said high frequency; and a regulator for closing said feed switches selectively to provide current to said motor in accordance with a reference current and in response to said current sampled in each of said feed lines.

9. A control according to claim 8 wherein said sampling means samples the current in each of said feed lines in response to a second magnitude of current in said clamp capacitor which is slightly less than said first magnitude.

\* \* \* \* \*